United States Patent Office 3,436,012
Patented Apr. 1, 1969

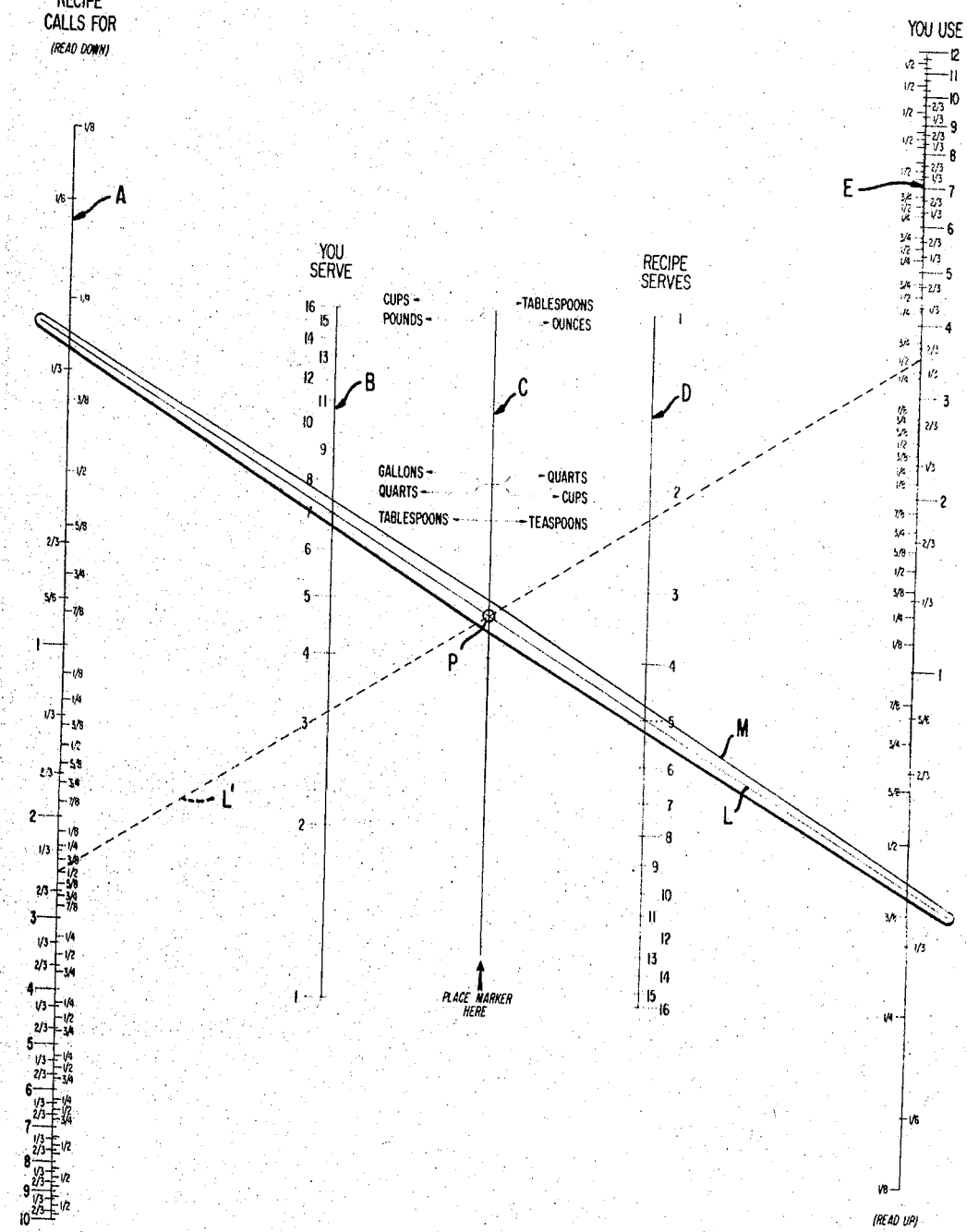

3,436,012
KITCHEN CALCULATOR AND METHOD FOR USE
Barbera W. Stephenson, 901 Orchard Way,
Silver Spring, Md. 20904
Filed Mar. 12, 1968, Ser. No. 712,413
Int. Cl. G06k 11/02
U.S. Cl. 235—61                                    4 Claims

ABSTRACT OF THE DISCLOSURE

A nomographic calculator for use in scaling recipes and converting common kitchen measurements. The nomographic calculator is a superimposed combination of two nomographs and a moveable, pivoted marker.

Summary of the invention

Recipes are commonly written to serve a predetermined number of people. There is a problem in using such recipes to serve a different number of people. The housewife must either scale up or scale down the recipe or risk having leftovers or insufficient food for the number served. It is obviously desirable to scale the recipe to provide the proper amount of food. The scaling must be done with reasonable accuracy to avoid changing the recipe portions and the characteristics of the resulting food product. But if a recipe calls for ¾ cup of milk and serves 5 people, it is difficult to convert mentally to the correct amount of milk for a recipe to serve 8 people. This invention provides a nomographic calculator for quick and accurate conversion of recipes.

Brief description of the drawing

The figure is a plan view of a preferred embodiment of the nomographic calculator.

Description of the preferred embodiment

The nomograph, as illustrated in the single figure, has two three-line nomographs superimposed to form one five-line nomograph. These nomographs may be placed on any suitable base material, such as paper, plastic, or fiberboard. It may be preferable to use a base material impervious to the usual recipe ingredients which may accidentally fall on the nomograph.

The first of two nomographs contains lines B, C, and D. Line B contains a series of numerical indicia interposed between the line ends in a logarithmic manner to represent the number of people to be served. In the preferred embodiment as illustrated, the number of people to be served runs from 1 to 16.

Note that with the number of people to be served, as with the numerical indicia of the other lines, the actual numbers used are those of the preferred embodiment only because such numbers represent the numerical ranges most widely used in household cookery. However, in an embodiment for institutional cooking, a different range of numbers could be used which would be within the scope of the invention.

Line D also contains a series of numerical indicia interposed between the line ends in a logarithmic manner and representing the number of people served by the recipe as written. Because in the illustrated embodiment, line D is located on the opposite side of a marker line C from line B, the numbers on line D are located in opposite order from those on line B. Thus line B is read from bottom to top and line D is read from top to bottom. A marker line C, on which no numerical indicia are needed, is located in the illustrated embodiment between lines B and D. Line C is situated such that for any constant ratio of numerical indicia on lines B and D, a straight line between the two indicia will intercept a given point on line C.

For example, since ⅔=⁴⁄₆, the same point on line C will be intercepted by a straight line drawn from point 2 on line B to point 4 on line D as will be intercepted by a straight line drawn from point 4 on line B to point 8 on line D.

The second of the two nomographs contains lines A, C, and E. Line C is a part of both of the nomographs and serves a transfer intermediate readings from the first nomograph to the second nomograph.

Line A contains a series of numerical indicia interposed between the line ends in a logarithmic manner to represent the amount of an ingredient required by a recipe as written. The indicia of line A are read from the top and are illustrated by integer and fractional units from ⅛ to 10 units.

Line E contains a series of numerical indicia interposed between the line ends in a logarithmic manner to represent the amount of an ingredient required by a recipe as prepared. The indicia of line E are read from the top and are illustrated by integer and fractional units from ⅛ to 12 units.

Lines A and E are so situated with relation to line C and the indicia of lines A and E are so placed with respect to lines A, C, and E that for any constant ratio of numerical indicia on lines A and E, a straight line between the two indicia will intercept a given point on line C.

If $n_a$ is a number on line A, $n_b$ is a number on line B, $n_d$ is a number on line D and $n_e$ is a number on line E and if $n_a$, $n_b$, $n_d$ and $n_e$ are so chosen that $n_b/n_d = n_e/n_a$, then, because of the arrangement of the two nomographs, a straight line drawn from $n_b$ to $n_d$ will intercept line C at the same point as will a straight line drawn from $n_a$ to $n_e$. This quality provides the means for transferring intermediate data from the first nomograph to the second nomograph.

A marker or indicator M is provided and is adapted to be given translatory motion up or down marker line C. Marker M can be affixed by pivotal connector P to any point along line C. Upon being affixed, the marker is capable of rotational motion only. In the preferred embodiment, the marker M is transparent with a straight line L marked thereon.

Method of using

The written recipe to be used is consulted to determine the number of people served by the recipe as written. One point on line L is placed over the numerical indicia on line D corresponding to that number. The cook determines the number of people to be served and places another point on line L over the numerical indicia on line B corresponding to the number of people to be served. The pivotal connector is then connected to line C in such manner as not to disturb the intersection points of line L with lines B and D. In the figure is illustrated the case where the recipe was written to serve 5 but the cook desires to serve 7.

The marker is then rotated so that line L intersects line A at a point marked by numercial indicia corresponding to the number of units of ingredients called for in the recipe as written. Line L then intersects line E at a point corresponding to the number of units of ingredients needed to prepare the recipe for the desired number of servings.

In the figure, for the case previously illustrated, suppose the recipe as written calls for 2½ cups of flour to serve 5 people. The marker is rotated until line L occupies the new position indicated by dotted line L'. Line L' intersects line E at 3½, indicating that 3½ cups of flour are needed to prepare the desired number of servings. Additional ingredients can be calculated without removing the pivotal connector P, as the ratio of servings remains correctly indicated by the pivot point.

The second nomograph as illustrated has a second function of converting from one unit of measure to another, for example from gallons to quarts. To convert from gallons to quarts, the pivot of the marker is affixed to line C at the point on line C having "Gallons" on one side and "Quarts" on the other. To convert 1½ gallons, set the marker on line A to 1½. The marker will indicate 6 on line E, corresponding to 6 quarts. Other common kitchen units may also be converted as required.

While the invention has been particularly shown and described with reference to a preferred embodiment thereof, it will be understood by those skilled in the art that various changes in form and details may be made therein without departing from the spirit and scope of the invention.

I claim:
1. A nomographic kitchen calculator comprising:
   (a) a base having marked thereon first, second, third, fourth and fifth parallel lines and first, second, third and fourth indicia interposed respectively between the ends of said first, second, third and fourth parallel lines, said marked base further comprising:
      (a1) a first nomograph comprising first, second, and fifth parallel lines, said first line bearing said first indicia representing the number of people served by a recipe as written, said second line bearing said second indicia representing the number of people to be served by said recipe as prepared, and a point on said fifth line located on a straight line through said first indicia and said second indicia being adapted to represent the ratio of said number of people to be served to said number of people served,
      (a2) a second nomograph comprising said third, fourth, and fifth parallel lines, said third line bearing said third indicia representing the amount of an ingredient required by said recipe as written, said fourth line bearing said fourth indicia representing the amount of said ingredient required by said recipe as prepared, and said point on said fifth line being also located on a straight line through said third indicia and said fourth indicia and
   (b) a marker adapted to be pivoted on said base at any point on said fifth line and to expend from said fifth line in a straight line across said first, second, third and fourth lines.

2. A nomographic kitchen calculator according to claim 1,
   (a) said first indicia being one of a first series of numerical indicia interposed between the ends of said first line in logarithmic manner,
   (b) said second indicia being one of a second series of numerical indicia interposed between the ends of said second line in logarithmic manner,
   (c) said third indicia being one of a third series of numerical indicia interposed between the ends of said third line in a logarithmic manner,
   (d) said fourth indicia being one of a fourth series of numerical indicia interposed between the ends of said fourth line in a logarithmic manner,
   said first line and said second line being so located on said nomograph with respect to said fifth line and said first and said second series of numerical indicia being respectively so arranged along said first and second lines that for any given ratio of first number to second number, said first number being represented by a corresponding one of said first series of numerical indicia and said second number being represented by a corresponding one of said second series of numerical indicia, a straight line extended through said one of said first series of numerical indicia and through said one of said second series of numerical indicia intersects said fifth line at a point corresponding exclusively to said given ratio,
   and said third line and said fourth line being so located on said nomograph with respect to said fifth line and said third and said fourth series of numerical indicia being respectively so arranged along said third and fourth lines that for said given ratio of third number to fourth number, said third number being represented by a corresponding one of said third series of numerical indicia and said fourth number being represented by a corresponding one of said fourth series of numerical indicia, a straight line extended through said one of said third series of numerical indicia and through said one of said fourth series of numerical indicia intersects said fifth line at said point corresponding exclusively at said given ratio.

3. A nomographic kitchen calculator according to claim 2 wherein said first and fourth lines are located to one side of said fifth line and said second and third lines are located to the other side of said fifth line.

4. A method of scaling a recipe to serve some required number of people, said recipe using certain amounts of a plurality of ingredients to serve a predetermined number of people comprising:
   (a) setting a straight-line indicator so that said straight line intersects a first line bearing logarithmically arranged indicia at a point having indicia corresponding to said predetermined number,
   (b) setting said indicator so that said straight line intersects a second line bearing logarithmically arranged indicia at a point having indicia corresponding to said required number,
   (c) pivotally affixing said indicator to a third line so that the point of intersection of said straight line and said third line remains fixed,
   (d) rotating said indicator to cause said straight line to intersect a fourth line bearing logarithmically arranged indicia at a point having a numerical indication equal to the amount of one of said plurality of ingredients required by said recipe as written,
   (e) measuring and using, according to the instructions of said recipe, a calculated amount of said one of said plurality of ingredients, said calculated amount being equal to a numerical indication of said calculated amount given by the point of intersection of said straight line and a fifth line bearing logarithmically arranged, indicia, and
   (f) repeating the steps of rotating said indicator, measuring and using ingredients a number of times corresponding to the number of said plurality of ingredients remaining to be scaled.

References Cited

UNITED STATES PATENTS

| 1,141,837 | 6/1915 | Schubert | 283—1 |
| 1,279,829 | 9/1918 | Bell | 235—61 |
| 1,667,812 | 5/1928 | Miller | 235—61 |
| 3,091,389 | 5/1963 | Wiken | 235—61 |

FOREIGN PATENTS 242,394   11/1925   Great Britain.

STEPHEN J. TOMSKY, *Primary Examiner.*

U.S. Cl. X.R.

235—89